US008414371B2

(12) United States Patent
Tempest et al.

(10) Patent No.: US 8,414,371 B2
(45) Date of Patent: Apr. 9, 2013

(54) GAMING APPARATUS AND METHOD HAVING A SEPARATE BUT SIMULTANEOUSLY OPERATING BONUS INDICATOR

(75) Inventors: Kim Tempest, Tucson, AZ (US); Jon McNair Leupp, Tucson, AZ (US); Charles D. Lombino, Henderson, NV (US); Marion C. Biron, Las Vegas, NV (US)

(73) Assignee: Aristocrat Technology Australia Pty Limited (AU)

(*) Notice: Subject to any disclaimer, the term of this patent is extended or adjusted under 35 U.S.C. 154(b) by 197 days.

(21) Appl. No.: 10/661,348

(22) Filed: Sep. 12, 2003

(65) Prior Publication Data

US 2005/0056995 A1 Mar. 17, 2005

(51) Int. Cl.
*A63F 13/00* (2006.01)

(52) U.S. Cl.
USPC .......... 463/16

(58) Field of Classification Search .......... 463/20, 463/21, 25, 26, 16–18; 273/143 R, 138.1, 273/139
See application file for complete search history.

(56) References Cited

U.S. PATENT DOCUMENTS

| | | | | |
|---|---|---|---|---|
| 4,676,506 | A | 6/1987 | Crouch | |
| 5,393,057 | A | 2/1995 | Marnell | |
| 5,722,891 | A | 3/1998 | Inoue | |
| 5,823,874 | A | 10/1998 | Adams | |
| 5,848,932 | A | 12/1998 | Adams | |
| 5,941,773 | A | 8/1999 | Harlick et al. | |
| 5,980,384 | A | 11/1999 | Barrie | |
| 6,033,307 | A | 3/2000 | Vancura | |
| 6,059,289 | A | 5/2000 | Vancura | |
| 6,089,976 | A | 7/2000 | Schneider et al. | |
| 6,305,686 | B1 * | 10/2001 | Perrie et al. | 273/146 |
| 6,394,902 | B1 | 5/2002 | Glavich et al. | |
| 6,461,241 | B1 | 10/2002 | Webb et al. | |
| 6,464,582 | B1 | 10/2002 | Baerlocher et al. | |
| 6,471,208 | B2 | 10/2002 | Yoseloff et al. | |
| 6,491,584 | B2 | 12/2002 | Graham et al. | |
| 6,494,785 | B1 | 12/2002 | Gerrard et al. | |
| 6,506,118 | B1 | 1/2003 | Baerlocher et al. | |
| 6,511,375 | B1 | 1/2003 | Kaminkow | |
| 6,514,141 | B1 | 2/2003 | Kaminkow et al. | |
| 6,517,433 | B2 | 2/2003 | Loose et al. | |
| 6,533,273 | B2 * | 3/2003 | Cole et al. | 273/138.1 |
| 6,533,661 | B2 | 3/2003 | Sanders | |
| 6,537,152 | B2 | 3/2003 | Seelig et al. | |
| 6,595,854 | B2 * | 7/2003 | Hughs-Baird et al. | 463/20 |
| 6,605,000 | B2 * | 8/2003 | Adams | 463/20 |
| 6,620,046 | B2 * | 9/2003 | Rowe | 463/25 |
| 6,634,945 | B2 * | 10/2003 | Glavich et al. | 463/25 |
| 6,652,378 | B2 * | 11/2003 | Cannon et al. | 463/20 |

(Continued)

*Primary Examiner* — Kurt Fernstrom

(74) *Attorney, Agent, or Firm* — McAndrews, Held & Malloy, Ltd.

(57) ABSTRACT

A gaming machine and method comprising a primary game with a plurality of gaming symbols and a separate bonus indicator. Operation of the bonus indicator is automatically initiated upon commencement of the primary game and play of the bonus indicator is of approximately the same duration as play of the primary game. The outcome of the bonus indicator may be entirely independent of the outcome of the primary game. A positive outcome on the bonus indicator may yield either a prize for the player or an opportunity to play a bonus round game. In its preferred embodiment, the invention includes a five-reel slot game as the primary game and a single-reel slot game as the bonus indicator.

17 Claims, 2 Drawing Sheets

U.S. PATENT DOCUMENTS 6,656,048 B2 * 12/2003 Olsen .............................. 463/25
6,663,489 B2 * 12/2003 Baerlocher ..................... 463/20
6,705,944 B2 * 3/2004 Luciano .......................... 463/20
6,758,473 B2 * 7/2004 Seelig et al. .............. 273/143 R
6,800,026 B2 * 10/2004 Cannon ........................... 463/16
6,832,957 B2 * 12/2004 Falconer ......................... 463/20
6,902,478 B2 * 6/2005 McClintic ....................... 463/16

* cited by examiner

GAMING APPARATUS AND METHOD HAVING A SEPARATE BUT SIMULTANEOUSLY OPERATING BONUS INDICATOR

FIELD OF THE INVENTION

The present invention relates to a gaming apparatus and method in which there is a primary or base game and a separate symbol or indicator of a bonusing game.

BACKGROUND AND SUMMARY OF THE INVENTION

Many existing gaming machines include a primary or base game and one or more bonus games, rounds, or features wherein the bonus feature is initiated when the player reaches a bonus triggering event in the primary game of the gaming device. These bonus rounds provide players with additional opportunities to accumulate winnings and are beneficial for attracting and keeping players at gaming machines.

In slot machines with reels, the bonus triggering event usually occurs when the player reaches a predetermined combination of symbols on the reels or when a specified bonusing symbol is displayed on one or more reels. The bonus triggering combination may be the same or different from the predetermined combination that defines whether the player has won the primary game. Regardless, the same reels are used to indicate both whether the underlying game has been won and whether the player will advance to a bonus round. Thus, the bonus triggering event is not separate from the underlying game.

Existing patents describe a variety of bonus games. These bonus games, however, are almost invariably triggered and indicated by some event occurring in the primary game, not by a secondary indicia that serves the sole function of indicating that a player will go on to a bonus round. For instance, U.S. Pat. Nos. 6,033,307, 6,089,976, 6,461,241, 6,471,208, 6,517,433, 6,533,273, 5,823,874, 5,848,932, and 5,722,891 all describe bonus games that are triggered by a qualifying event in the primary game.

Other prior art gaming machines do involve the use of two different games but, in those inventions, the secondary games serve a different purpose and have a different functionality than the bonus indicator of the present invention. Thus, those secondary games are not used to indicate whether the player goes on to a bonus round, do not operate simultaneously with the primary game, and/or do not produce an outcome that is independent of the primary game. U.S. Pat. No. 5,393,057 describes a primary poker game linked to a secondary bingo game; however, the primary and secondary games do not operate simultaneously, are not independent of one another, and the secondary game is not used to indicate to the player whether she gets to go on to a bonus round. Similarly, U.S. Pat. No. 5,980,384 describes a primary game linked to a secondary game which is played over multiple rounds; again, the primary and secondary games do not operate simultaneously, are not independent of one another, and the secondary game is not used to indicate to the player whether she gets to go on to a bonus round. U.S. Pat. No. 4,676,506 describes an “odds indicator” that rotates simultaneously with the primary game. However, the sole purpose of this odds indicator is to provide a multiplier should there be a win in the underlying game; the odds indicator does not indicate that the player gets to play a bonus round.

There are many advantages to having a separate, but simultaneously operating, bonus indicator. The presence of a bonus indicator that is separate from the primary game creates the appearance of an increased chance of winning. Such a bonus indicator is therefore expected to increase player understanding of when and how the bonus round is initiated and to increase player excitement and participation.

Accordingly, it is an object of the present invention to provide a gaming apparatus and method which include a separate but simultaneously operating bonus indicator.

It is a further object of the present invention to provide a gaming apparatus and method in which a separate but simultaneously operating bonus indicator has an outcome that is substantially independent from the outcome achieved in the primary game.

DETAILED DESCRIPTION OF THE INVENTION

Figure 1:
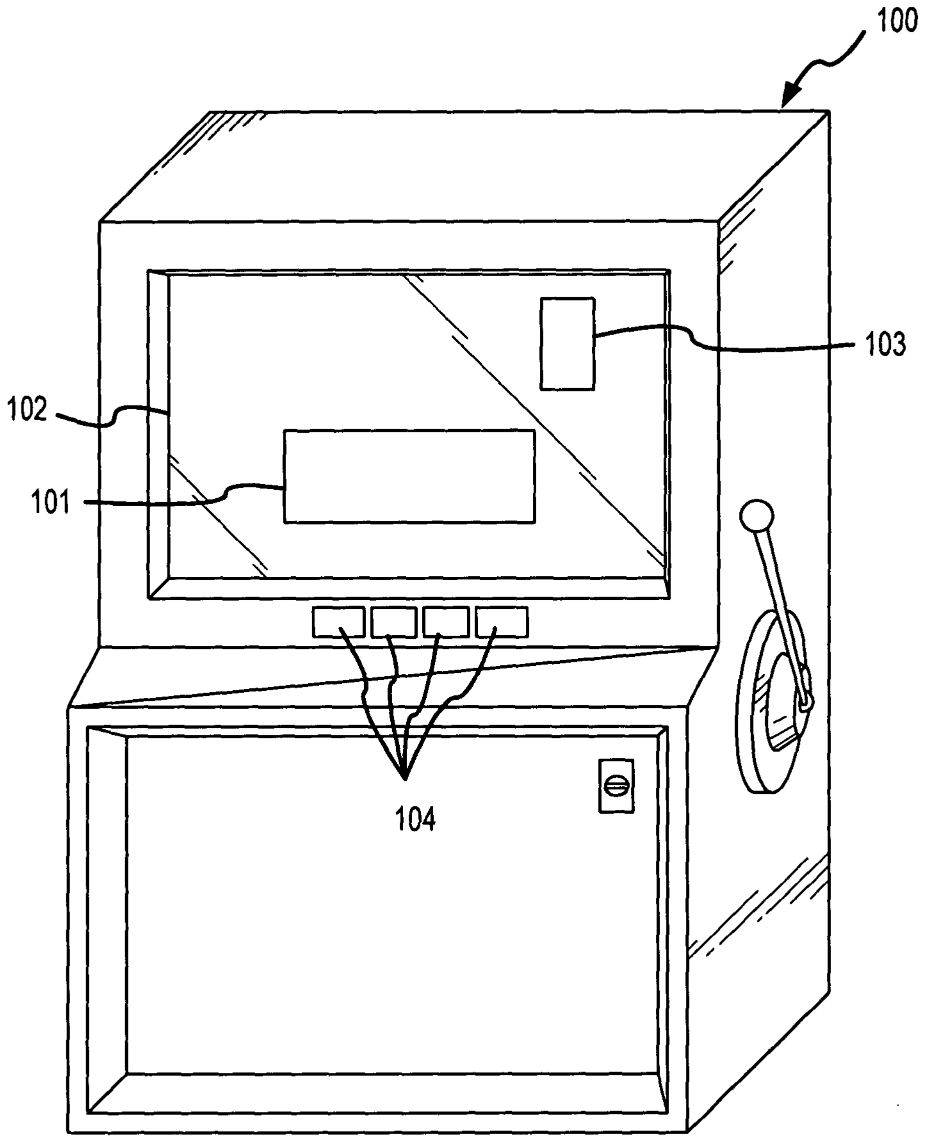
FIG. 1 shows a front view of a gaming apparatus constructed in accordance with the present invention.

FIG. 1 shows a front view of a gaming machine constructed in accordance with the present invention. Referring to FIG. 1, the gaming machine 100 of the present invention comprises a primary game 101 and a separate and distinct bonus indicator 103. This bonus indicator 103 may be located on display 102, as shown on FIG. 1, or it may be placed in a separate location such as in a top box, over the machine or a bank of machines, in some other location on the gaming machine or in the casino, or on a separate display.

The primary game 101 may be any type of game, including card, dice, slot, or other games. Conventional input buttons 104 permit a player to make bets, initiate the primary game 101, and, when applicable, make other game playing choices. Technology that is well-known in the art, including a random number generator where applicable, is used to control the outcome of the primary game 101. If a player wins the primary game, he may be rewarded with money, credits, tokens, or other items of value.

When a player initiates a primary game 101, the bonus indicator 103 is automatically activated. Alternatively, the bonus indicator 103 may only be activated when a certain minimum bet is placed by the player. The bonus indicator operates at the same time that the underlying game is played. It is apparent to the player that the two events, play of the primary game and operation of the bonus indicator, are occurring substantially simultaneously. The primary game will directly yield an immediate reward if won; the bonus indicator, when stopped, will indicate whether the player will have an opportunity to potentially accumulate additional winnings during the play of a bonus round or feature of some sort enabled by the bonus indicator. The bonus indicator 103 is visually distinct and separate from the primary game 101.

Operation of the bonus indicator 103 is completed at the same time, immediately before, or shortly after play of the primary game 101 is completed. Thus, play of the primary game and operation of the bonus indicator are events of very similar duration and occur at the same time.

The gaming format of the bonus indicator 103 may be different than that of the primary game 101, such that it is apparent to the player that the function of the bonus indicator 103 is distinct from that of the primary game 101. That said, however, the bonus indicator may depict a card, dice, slot, or other game or indicia. A predetermined or random result of the bonus indicator 103 will inform the player that she has obtained the opportunity to participate in a bonus round.

The primary game 101 and the bonus indicator 103 may be substantially independent in some embodiments of the invention, meaning that it is possible for a player to attain: (1) a winning result from both the primary game 101 and the bonus indicator 103; (2) a winning result from the primary game 101 but not the bonus indicator 103; (3) a winning result from the bonus indicator 103 but not the primary game 101; or (4) a winning result from neither the primary game nor the bonus indicator. In other embodiments, the outcome of the primary game 101 may not be independent of the outcome of the bonus indicator 103. For instance, a positive outcome from the bonus indicator 103 might only be achieved if there is a win in the primary game 101.

The gaming machine of the present invention can be produced using electronic components that are conventional and in widespread use in the gaming industry. There are many combinations of components which will satisfactorily produce the desired features. One skilled in the art of logic and circuit design can readily make many and varying embodiments of the invention described herein. The gaming machine may be connected to an overall casino management system which monitors and controls its operation.

Figure 2:
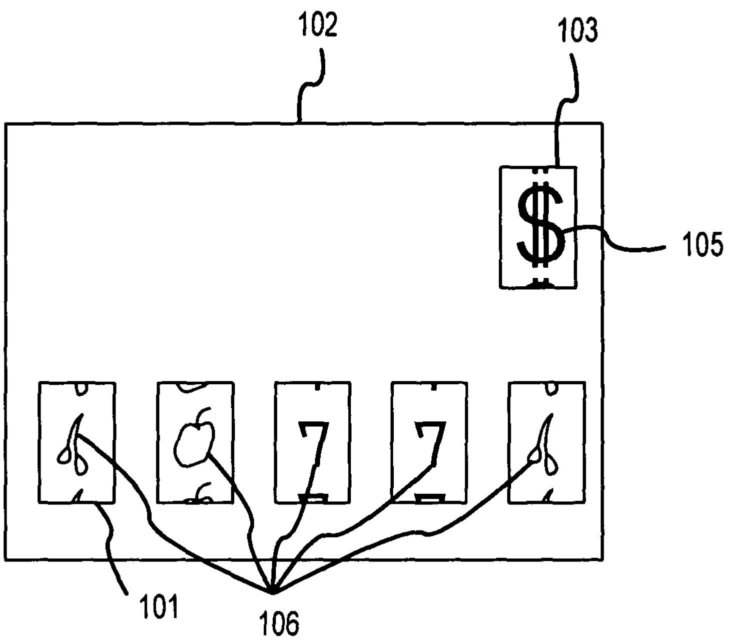
FIG. 2 shows an embodiment of the primary game and one form of bonus indicator of this invention.

FIG. 2 depicts an embodiment of the primary game 101 and a bonus indicator 103 of this invention on a display 102. Referring now to FIG. 2, the primary game 101 of this embodiment is a slot game consisting of a plurality of reels which may be either mechanical reels or computer generated images of reels which are displayed on a monitor. Each reel contains a plurality of symbols. Any recognizable symbol may be depicted on the reels, including representations of typical slot machine symbols, comedians, rock stars, other celebrities, cartoon characters, or any of an endless variety of symbols. Typically, a random number generator determines the outcome of the primary game 101. If a winning number is generated for the primary game, the reels will display a predetermined winning combination of symbols. Winnings may include credits, cash, tokens, or other items of value. A preferred embodiment of this invention contains a five reel slot game as the primary game 101.

In one preferred embodiment, as displayed in FIG. 2, a single reel, which may be either a mechanical reel or a computer generated image of a reel, is used as the bonus indicator 103. The symbols 105 on the single reel bonus indicator 103 may be the same or different from the symbols 106 of the reels of the primary game 101. The bonus indicator could also be any of a wide variety of other games or symbols, such as a playing card, a roulette type wheel, a rolling die, etc. As with the primary game 101, a random number generator may determine the outcome to be displayed by the bonus indicator 103. Similarly, a random number generator may determine the bonus prize amount or said amount may be predetermined.

The method of the present invention is practiced when a player initiates the primary game 101 by placing a wager and/or pressing the appropriate input buttons 104 to begin play. By starting the primary game 101, or by placing a predetermined minimum bet in the primary game 101, the player automatically activates the bonus indicator 103. In a preferred embodiment, the primary game 101 is a five-reel slot game and the bonus indicator 103 is a single reel. The single-reel bonus indicator 103 simultaneously spins as the reels of the primary game 101 also spin. The primary game is won if a predetermined combination of symbols are achieved. Additionally, the player may achieve a positive outcome from the bonus indicator, which means that he will be entitled to participate in a bonus round or feature.

In another embodiment, a gaming machine may be linked to other gaming machines to create a bank of hyperlinked gaming machines, i.e., group of interconnected gaming machines that share a common jackpot. In this hyperlinked embodiment, each gaming machine contributes toward and competes for a bonus, such as a progressive bonus, and the bonus indicator indicates which of the machines in the link, if any, wins the bonus prize or round.

The bonus indicator could also be used to show participation in a linked group of games, such as when the games are competing in a tournament. In such an embodiment, the first player in the tournament group to get a predefined or random indicia on the bonus indicator may win one or more prizes, including but not limited to, a random jackpot, an opportunity to play a bonus round, and/or a predefined jackpot.

The preceding examples of possible games and bonus indicators are provided only to describe some preferred embodiments of the invention. The invention, however, is not limited to the games or symbols described above. Those examples are intended to describe the new and unique features of the invention, the scope of which is defined by the following claims.

What is claimed is:

1. A gaming apparatus, comprising:

a primary game operable upon initiation to provide a plurality of symbols as a primary game outcome, said primary game having (i) a bonus feature, (ii) a first set of symbols for determining said primary game outcome, and (iii) a primary game award based on said primary game outcome; and a bonus indicator separate from and non-identical to said primary game, said bonus indicator(i) having a second set of symbols from which at least one symbol is provided as an indicator outcome for determining an awarding of said bonus feature of said primary game upon a predetermined indicator outcome, (ii) activatable automatically upon initiation of said primary game, (iii) arranged to operate substantially simultaneously with the operation of said primary game and for approximately the same duration as said primary game, and (iv) arranged to indicate, independent of any outcome of the primary game, a predetermined result as to whether a player is entitled to play a bonus round of at least one additional game so as to accumulate winnings in addition to a said primary game award.

2. The gaming apparatus of claim 1, wherein said primary game contains a plurality of reels, each of which is capable of displaying a portion of the first set of symbols and wherein said primary game award is awarded when a predetermined combination of the displayed portion of the first set of symbols is achieved.

3. The gaming apparatus of claim 1, wherein said bonus indicator is a roulette type wheel.

4. The gaming apparatus of claim 1, wherein said bonus indicator is one or more reels.

5. The gaming apparatus of claim 1, wherein said primary game contains a plurality of reels, each of which is capable of displaying a portion of the first set of symbols, wherein said primary game award is won when a predetermined combination of the displayed portion of the first set of symbols is achieved, and wherein said bonus indicator is a roulette type wheel.

6. The gaming apparatus of claim 1, wherein said primary game contains a plurality of reels, each of which is capable of displaying a portion of the first set of symbols, wherein said primary game award is won when a predetermined combination of the displayed portion of the first set of symbols is achieved, and wherein said bonus indicator is at least one reel.

7. The gaming apparatus of claim 1, wherein said apparatus is connected to an overall casino management system which monitors and controls said apparatus.

8. The gaming apparatus of claim 1, wherein said apparatus is linked to one or more other gaming apparatuses to create a bank of hyperlinked gaming apparatuses.

9. A method of gaming for use with a gaming machine, the method comprising:

wagering credit in a primary game having a bonus feature;

initiating said primary game, said initiating including displaying said primary game including a portion of a first set of symbols;

determining a primary game award based on the portion of the first set of symbols; and automatically initiating the operation of a separate bonus indicator when said primary game is initiated;

displaying said bonus indicator including displaying of at least one of a second set of symbols, said displaying including providing a predetermined result;

awarding said bonus feature based on said second set of symbols;

operating said separate bonus indicator substantially simultaneously with said primary game;

running said bonus indicator for approximately the same duration as said primary game; and indicating said predetermined result as to whether a player is entitled to said bonus feature of said primary game.

10. The method of claim 9, wherein said primary game contains a plurality of reels, each of which is capable of displaying a portion of the first set of symbols and wherein said primary game award is won when a predetermined combination of the displayed portion of the first set of symbols is achieved.

11. The method of claim 9, wherein said bonus indicator is a roulette type wheel.

12. The method of claim 9, wherein said bonus indicator is one or more reels.

13. The method of claim 9, wherein said primary game contains a plurality of reels, each of which is capable of displaying a portion of the first set of symbols, wherein said primary game award is won when a predetermined combination of the displayed portion of the first set of symbols is achieved, and wherein said bonus indicator is a roulette type wheel.

14. The method of claim 9, wherein said primary game contains a plurality of reels, each of which is capable of displaying a portion of the first set of symbols, wherein said primary game award is won when a predetermined combination of the displayed portion of the first set of symbols is achieved, and wherein said bonus indicator is at least one reel.

15. The method of claim 9, wherein said gaming machine is connectable to an overall casino management system which monitors and controls said gaming machine.

16. The method of claim 9, wherein said gaming machine is linkable to one or more other gaming machines to create a bank of hyperlinked gaming machines.

17. A gaming apparatus, comprising:

a display;

a primary game having a bonus feature, said primary game configured to operate to produce at said display a winning primary game outcome; and a bonus indicator for indicating a predetermined result as to whether a player is entitled to play a bonus round of at least one additional game so as to accumulate winnings in addition to a winning of said primary game, and being (i) enabled automatically upon initiation of said primary game, (ii) arranged to operate substantially simultaneously with said primary game, and (iii) displayed separately from said primary game outcome at said display.

* * * * *